(12) United States Patent
Nabeshima

(10) Patent No.: US 7,099,045 B2
(45) Date of Patent: Aug. 29, 2006

(54) IMAGE PROCESSING APPARATUS, IMAGE FORMING APPARATUS, AND IMAGE PROCESSING METHOD FOR JUDGING PIXELS IN EDGE AREA OF CHARACTER IN HALFTONE-DOT AREA

(75) Inventor: Takayuki Nabeshima, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 1078 days.

(21) Appl. No.: 10/092,918

(22) Filed: Mar. 8, 2002

(65) Prior Publication Data

US 2002/0126315 A1    Sep. 12, 2002

(30) Foreign Application Priority Data

Mar. 9, 2001 (JP) ............................. 2001-066472

(51) Int. Cl.
  H04N 1/40 (2006.01)
  G06T 7/00 (2006.01)
  G06K 9/34 (2006.01)
  G06K 9/46 (2006.01)
  H04N 1/409 (2006.01)
  G06T 5/00 (2006.01)

(52) U.S. Cl. .............. 358/2.1; 358/3.26; 358/462; 358/463; 382/176; 382/194; 382/199; 382/275

(58) Field of Classification Search .............. 358/1.9, 358/2.1, 3.06, 3.15, 534, 532, 462, 463, 3.26, 358/3.27; 382/173, 176, 194, 195, 199, 190
See application file for complete search history.

(56) References Cited

U.S. PATENT DOCUMENTS 5,148,495 A * 9/1992 Imao et al. ................. 382/176
6,775,031 B1 * 8/2004 Fujiwara ..................... 358/2.1
2002/0118391 A1 * 8/2002 Akahori et al. ............. 358/2.1
2004/0175037 A1 * 9/2004 Guleryuz .................... 382/176
2005/0088695 A1 * 4/2005 Fuchigami .................. 358/2.1

FOREIGN PATENT DOCUMENTS

| JP | 05-153393 | 6/1993 |
| JP | 09-247436 | 9/1997 |
| JP | 11-266360 | 9/1999 |
| JP | 2000-287077 | 10/2000 |

OTHER PUBLICATIONS

U.S. Appl. No. 09/369,176—"Haltone dot Image Discrimination Method and Image Processing Device".
U.S. Appl. No. 09/568,669—"Image Processing Apparatus, Image Processing Method and Computer Program Product for Image Processing".

* cited by examiner

Primary Examiner—Scott A. Rogers
(74) Attorney, Agent, or Firm—Buchanan Ingersoll PC

(57) ABSTRACT

Disclosed are an image processing apparatus and an image processing method that can decrease image quality deterioration caused by unsuitable image correction processing performed on a pixel in a halftone-dot area due to a misjudgment of an image type, and an image forming apparatus that utilizes the image processing apparatus. A characteristic of a halftone-dot area is judged by, for example, counting the number of isolated pixels detected by an isolated pixel detection filter with a predetermined size. A parameter such as a threshold for the number of inner edge pixels for use in a judgment of an edge area of a character that is present on a halftone-dot area is switched (between thresholds 503 and 504), based on the characteristic of the halftone-dot area.

13 Claims, 11 Drawing Sheets

FIG.7

| V11 | V12 | V13 | V14 | V15 |
|-----|-----|-----|-----|-----|
| V21 | V22 | V23 | V24 | V25 |
| V31 | V32 | V33 | V34 | V35 |
| V41 | V42 | V43 | V44 | V45 |
| V51 | V52 | V53 | V54 | V55 |

FIG. 8

| V11 | V12 | V13 | V14 | V15 | V16 | V17 |
|---|---|---|---|---|---|---|
| V21 | V22 | V23 | V24 | V25 | V26 | V27 |
| V31 | V32 | V33 | V34 | V35 | V36 | V37 |
| V41 | V42 | V43 | V44 | V45 | V46 | V47 |
| V51 | V52 | V53 | V54 | V55 | V56 | V57 |
| V61 | V62 | V63 | V64 | V65 | V66 | V67 |
| V71 | V72 | V73 | V74 | V75 | V76 | V77 |

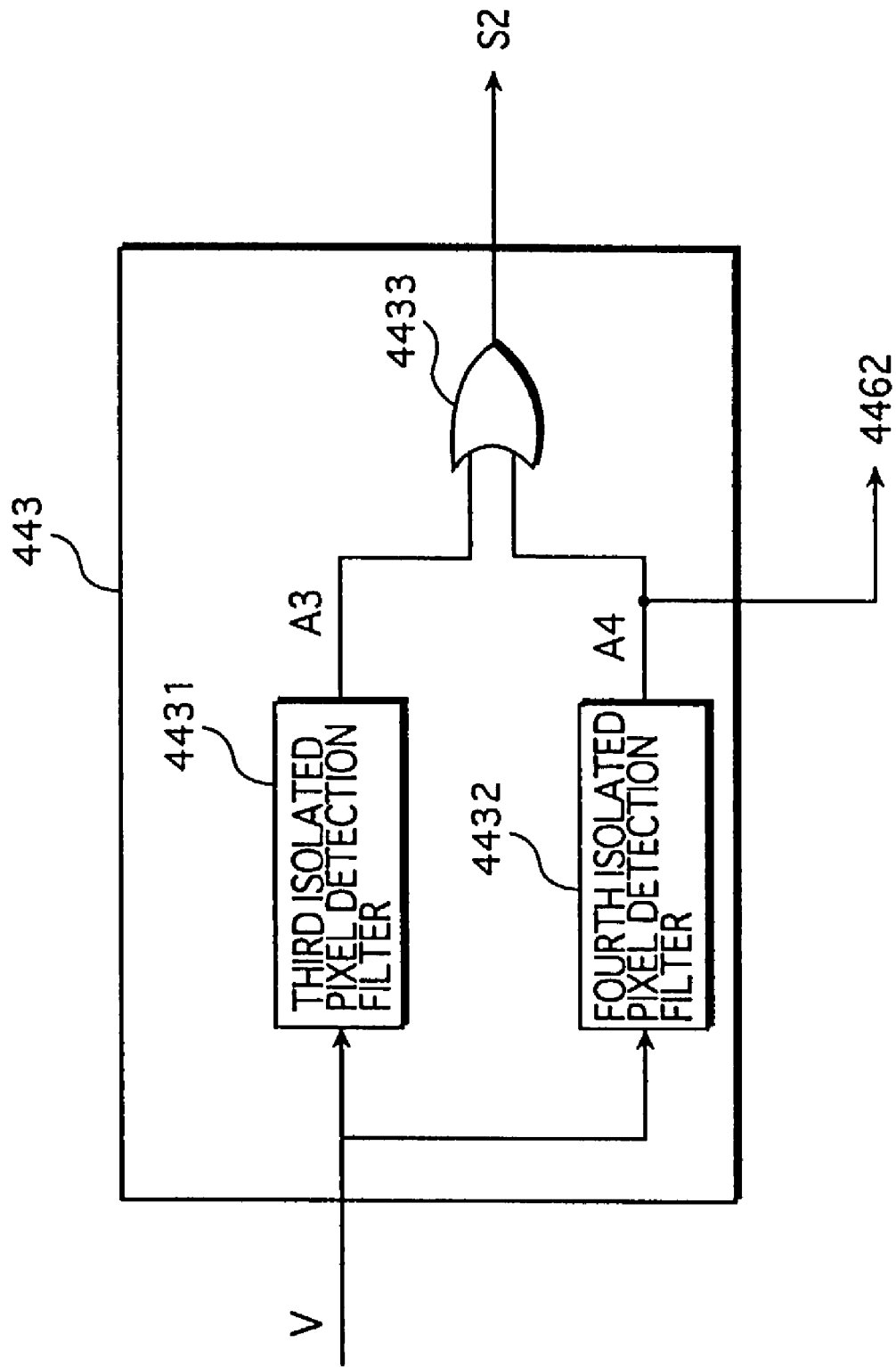

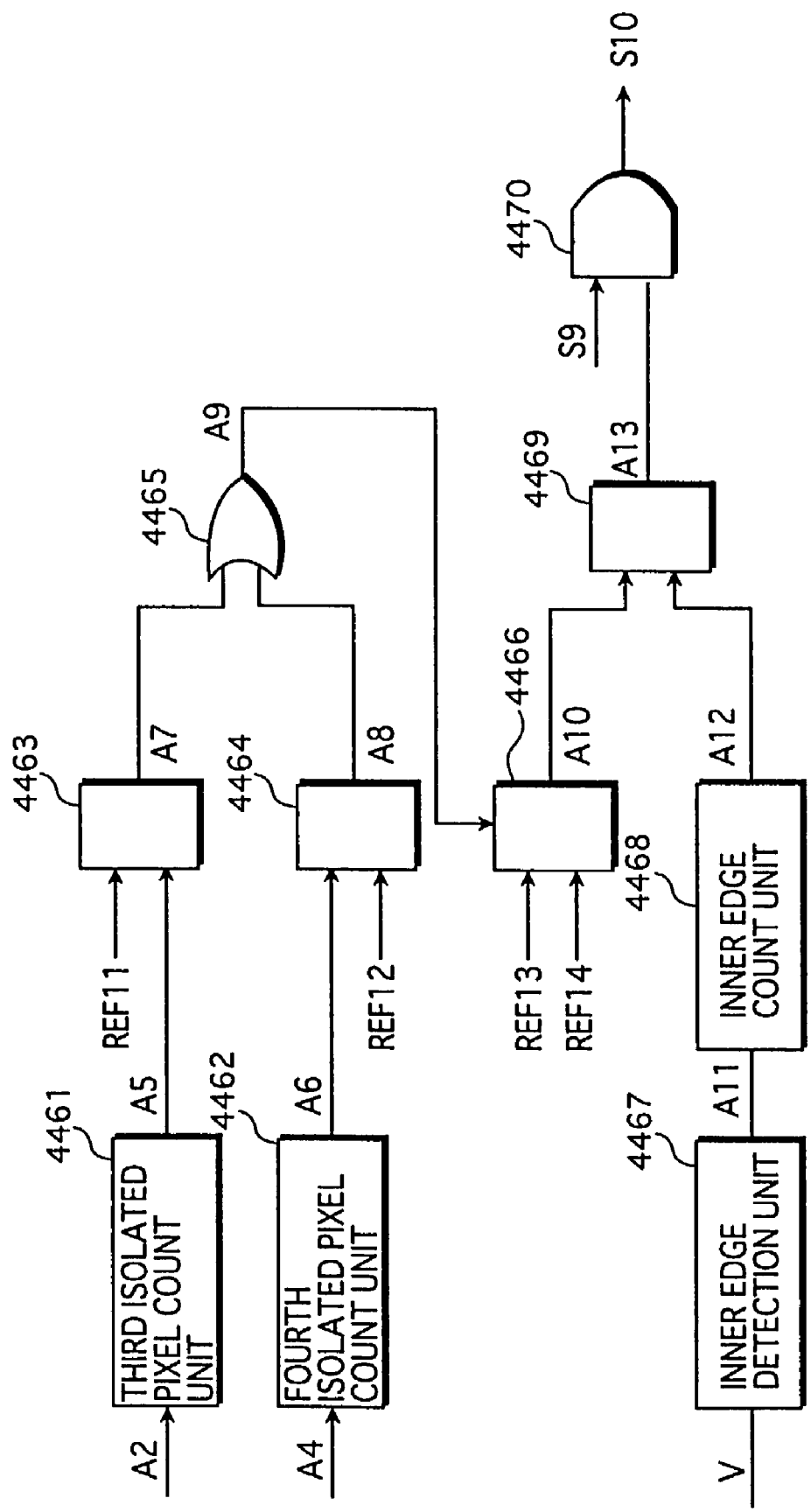

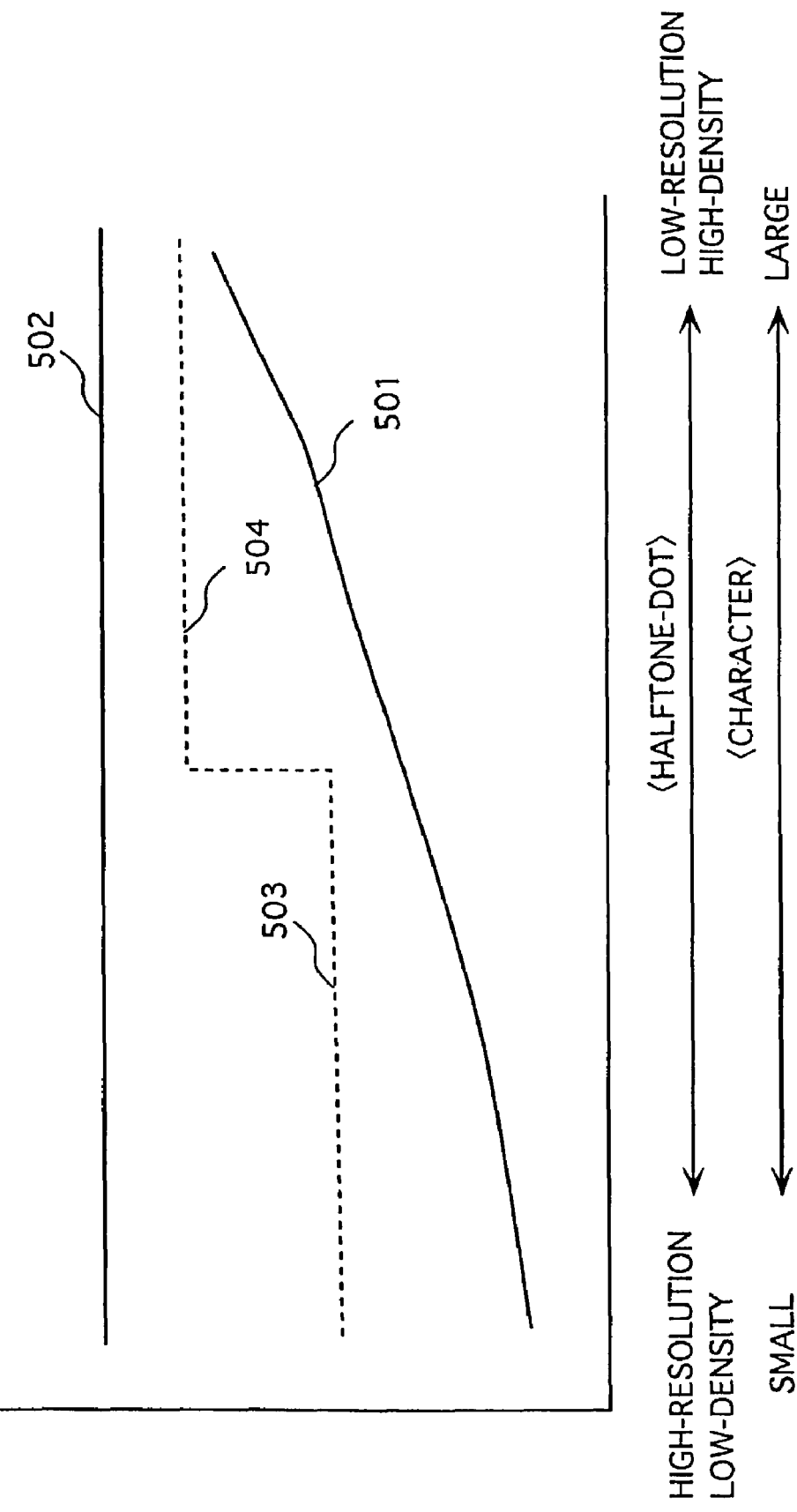

IMAGE PROCESSING APPARATUS, IMAGE FORMING APPARATUS, AND IMAGE PROCESSING METHOD FOR JUDGING PIXELS IN EDGE AREA OF CHARACTER IN HALFTONE-DOT AREA

This application is based on Patent Application No. 2001-66472 filed in Japan, the content of which is hereby incorporated by reference.

BACKGROUND OF THE INVENTION (1) Field of the Invention

The present invention relates to an image processing apparatus, and particularly to a technique for decreasing deterioration of image quality in an image forming apparatus that forms an image based on digital image data.

(2) Description of Related Art

In image forming apparatuses that form an image based on digital image data, various image processing such as smoothing and edge enhancement is generally employed to improve image quality. Such image processing is performed on pixels of image data in accordance with an image type, examples of which include a character image and a halftone-dot image. To be more specific, a pixel that is judged to be in a halftone-dot area is typically subjected to smoothing, and a pixel that is judged to be in an edge area of a character is typically subjected to edge enhancement.

Here, the following describes an example of a method for judging whether each of pixels included in image data is in an edge area of a character or not. Each pixel is set as a target pixel to be judged, and the first judgment is performed as to whether the target pixel is an inner edge pixel or not, using a linear differential filter or a quadratic differential filter with a predetermined size, for example, of 5*5 pixels. An "inner edge pixel" is an edge pixel with lower brightness at the transition from an area with low brightness to an area with high brightness. Then, the second judgment is performed as to whether the target pixel is in an edge area of a character or not, by counting the number of inner edge pixels present in a predetermined area. According to this method, brightness data of each pixel is first made to pass through the filter including the target pixel as the center. The first judgment as to whether the target pixel is an inner edge pixel is performed, by judging whether the relationship between brightness of the target pixel and brightness of nearby pixels satisfies a predetermined condition.

Following this, the second judgment as to whether the target pixel is in an edge area of a character is performed, by counting the number of inner edge pixels present in a predetermined area such as an area consisting of 9*9 pixels, and comparing the count number with a predetermined threshold. To be more specific, when the count number is above the predetermined threshold, the target pixel is judged to be in an edge area of a character.

However, the above conventional image processing apparatuses have the problem that a judgment as to whether a pixel is in an edge area of a character, or a pixel is included in a halftone-dot that constitutes a halftone-dot area, may not be performed correctly, particularly when, for example, a character is present on a halftone-dot area.

The following describes this problem, with reference to FIG. 1. In the figure, the horizontal axis indicates resolution and density of a halftone-dot area, and a size of a character, and the vertical axis indicates the number of inner edge pixels to be counted in the above predetermined area.

Here, the following briefly describes the meaning of the terms "resolution" and "density" of a halftone-dot image. For a halftone-dot image, resolution can be defined by the number of halftone-dots present in a predetermined area. Density (gradation) of the halftone-dot area depends on a total area occupied by a plurality of halftone-dots included therein. In general, when two halftone-dot images with different resolution have the same density, the halftone-dot image with lower-resolution (where a distance between the center of one halftone-dot to the center of an adjacent halftone-dot is larger) includes halftone-dots of a larger size, and the halftone-dot image with higher-resolution (where a distance between the center of one halftone-dot to the center of an adjacent halftone-dot is smaller) includes halftone-dots of a smaller size.

For a halftone-dot image, density can be defined by resolution (a distance from the center of one halftone-dot to the center of an adjacent halftone-dot) and a size of each halftone-dot. In general, when two halftone-dot images with different density have the same resolution, the halftone-dot image with higher-density includes halftone-dots of a larger size, and the halftone-dot image with lower density includes halftone-dots of a smaller size.

A curve 901 indicates the relationship between (a) resolution and density of a halftone-dot area and (b) the number of inner edge pixels to be detected, in the case of a halftone-dot image. A curve 902 indicates the relationship between (a) a size of a character and (b) the number of inner edge pixels to be detected, in the case of a character image.

As the figure shows, a greater number of pixels present at a periphery of a halftone-dot are judged to be inner edge pixels, as a halftone-dot area has lower-resolution or higher-density, in other words, as a size of a halftone-dot that constitutes the halftone-dot area increases. Accordingly, if a threshold for a judgment of an edge area of a character is set at a value "A" in the figure, pixels in a halftone-dot area with low-resolution or high-density may be misjudged to be pixels in an edge area of a character.

If such a misjudgment occurs, edge enhancement is performed on pixels of a halftone-dot that constitutes a halftone-dot area, causing image quality to deteriorate drastically. On the other hand, if the threshold is set at a value "B" in view of preventing such a misjudgment of pixels in a halftone-dot area with low-resolution or high-density as pixels in a character image, pixels in a character image may contrarily be misjudged to be pixels in a halftone-dot area due to fluctuated scanner characteristics and the like. If such a misjudgment occurs, smoothing is performed on pixels in an edge area of a character, also causing image quality to deteriorate.

SUMMARY OF THE INVENTION

The object of the present invention, therefore, is to provide an image processing apparatus that can decrease a misjudgment between a halftone-dot area and a character edge area, at least in a halftone-dot area with low-density, or in a halftone-dot area with high-resolution, and thereby decreasing image quality deterioration, and to provide an image forming apparatus that utilizes the image processing apparatus.

The above object can be achieved by an image processing apparatus, including: a character-on-halftone area judgment unit for judging whether a target pixel is in an edge area of a character that is present on a halftone-dot area, using a parameter; a halftone-dot characteristic judgment unit for judging a characteristic of a halftone-dot area, when the target pixel is in the halftone-dot area; and a selector for switching between a plurality of parameters to be used by the character-on-halftone area judgment unit, based on a judgment result of the halftone-dot characteristic judgment unit.

According to this construction, the switch is performed between a plurality of parameters to be used for judging an edge area of a character that is present on a halftone-dot area, based on a characteristic of a halftone-dot area. Therefore, a misjudgment between a halftone-dot area and a character edge area can be decreased, thereby decreasing image quality deterioration.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIG. 7 shows an isolated pixel detection filter with a size of 5*5 pixels for a target pixel "V33";

FIG. 8 shows an isolated pixel detection filter with a size of 7*7 pixels used in a second isolated pixel detection filter 4422;

FIG. 9 shows the construction of a black isolated pixel detection unit 443;

FIG. 10 shows the construction of a character-on-halftone area judgment unit; and FIG. 11 shows a relationship between resolution or density of a halftone-dot area, a size of a character, and the number of inner edge pixels to be detected.

DESCRIPTION OF THE PREFERRED EMBODIMENT

The following describes a preferred embodiment of an image processing apparatus and an image forming apparatus relating to the present invention, with reference to the drawings.

(1) Overall Construction of the Image Processing Apparatus

Figure 2:
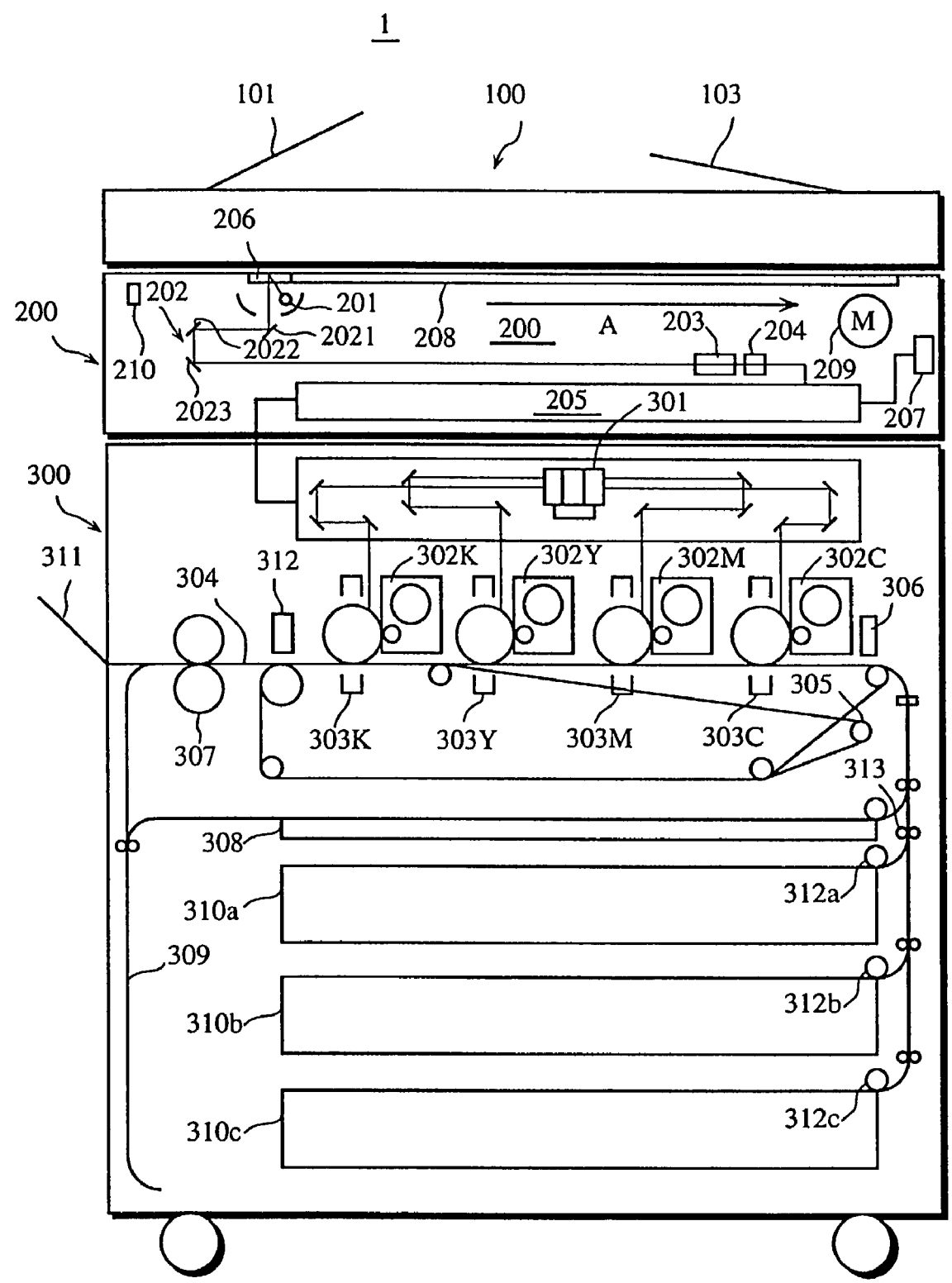
FIG. 2 is a schematic cross sectional view showing the overall construction of a copying machine 1.

FIG. 2 is a schematic cross sectional view showing the overall construction of a full-color copying machine 1 (hereafter simply referred to as a "copying machine") as one example of the image forming apparatus.

In the copying machine 1, an image forming unit 300 forms an image based on digital image data obtained by an image reading unit 200 reading a document. An automatic document feeder 100 is provided on the image reading unit 200. Here, an image is typically formed in the following way. A document is fed to an image reading position by the automatic document feeder 100 and is read by the image reading unit 200, and the obtained image data is transmitted to the image forming unit 300, which forms the image on a recording sheet. The copying machine 1 can be connected to external devices, such as a personal computer (PC), via an interface 207. This connection provides the copying machine 1 with additional features such as (a) scanner function for outputting image data read by the image reading unit 200 to an external device, and (b) printer function for receiving input of image data from an external device and forming an image by the image forming unit 300, based on the input image data.

The automatic document feeder 100 feeds a document placed on a document feed tray 101 to the image reading position of the image reading unit 200, and after the image is read, discharges the document to a document discharge tray 103. The document transportation operation is accomplished in accordance with instructions from a control panel (not shown), and the document discharge operation is accomplished in accordance with a reading end signal from the image reading unit 200. When a plurality of documents are stacked on the document feed tray 101, these control signals are continuously generated to sequentially transport the documents, read images of the documents, and discharge the documents.

In the image reading unit 200, an exposure lamp 201 illuminates the document placed on a document glass 208, and a mirror group 202 including three mirrors 2021 to 2023 and a lens 203 directs the light reflected by the document to form an image on a CCD sensor 204. The exposure lamp 201 and the first mirror 2021 are driven by a scan motor 209 in the direction of arrow A at a speed V corresponding to the magnification ratio, so as to scan the entire surface of the document placed on the document glass 208. While the document is being scanned using the exposure lamp 201 and the first mirror 2021, the second mirror 2022 and the third mirror 2023 move in the direction of arrow A at a speed V/2. The position of the exposure lamp 201 is calculated and controlled, using the amount of movement from the home position, i.e., using the number of steps of the scan motor 209 and detection signals from a scan home position sensor 210. The reflected light entering the CCD sensor 204 is converted into electric signals within the CCD sensor 204. The image processing unit 205 then subjects the electric signals to various image processing, such as analogue processing, analogue-to-digital (AD) conversion, and digital image processing, and then transmits the signals to the interface 207 or to the image forming unit 300. A white shading correction plate 206 is arranged in close proximity to the document reading start position of the document glass 208. Prior to reading of the document, the shading correction plate 206 is read to generate correction data for shading correction.

The following describes the image forming unit 300. First, exposure and imaging are described.

Image data transmitted from the image reading unit 200 or the interface 207 is converted into print data of each of colors C (cyan), M (magenta), Y (yellow), and K (black), and is transmitted to a control unit of each exposure head (not shown). The control unit of each exposure head makes a laser emit a laser beam in accordance with a pixel value of the transmitted image data, and performs a one-dimensional scan with the emitted laser beam via a polygon mirror 301, to optically expose the surface of a photoconductor in each of the imaging units 302C, 302M, 302Y, and 302K.

In each of the imaging units 302C to 302K, elements required for an electrophotographic process are arranged around the periphery of a photoconductor. The electrophotographic process is continuously performed as the photoconductor for each of C, M, Y, and K is rotated clockwise. The imaging units 302C to 302K necessary for forming an image each are integrated, and are detachable from the body. The latent images formed on the photoconductors in the imaging units 302C to 302K by the above exposure are developed by developing units of respective colors. The toner images developed on the surface of the photoconductors in the imaging units 302C to 302K are transferred onto a recording sheet transported on a paper transport belt 304, by transfer chargers 303C to 303K respectively arranged to face the photoconductors in the imaging units 302C to 302K within the paper transport belt 304.

The following describes the recording sheet feeding, transport, and fixing operations. The recording sheet onto which an image is to be transferred is fed to the transfer position in the following sequence and the image is formed on the recording sheet. Recording sheets of various sizes are loaded beforehand in paper feed cassettes 310a to 310c. A recording sheet of a desired size is fed to the transport path by a corresponding one of the paper feed rollers 312a to 312c respectively mounted on the paper feed cassettes 310a to 310c.

The recording sheet fed to the transport path is transported onto the paper transport belt 304 by a transport roller pair 313. Here, a reference mark on the paper transport belt 304 is detected by a timing sensor 306, so that a transport timing of the recording sheet is adjusted. Also, in the imaging units 302C to 302K, three registration correction sensors 312 are arranged along the main scanning direction furthest downstream in the direction of the transportation of the recording sheet. When a registration pattern is formed on the paper transport belt 304, the amount of color aberration is detected in the main scanning direction and the sub scanning direction of the C, M, Y, and K images by the registration correction sensors 312. Print image correction and image distortion correction are performed by a print image control unit (PIC unit). As a result, color aberration on the recording sheet can be prevented. The toner image transferred onto the recording sheet is fused and fixed thereon via heating by the fixing roller pair 307, and then the recording sheet is discharged to a discharge tray 311.

Note that in the case of duplex copies, an image is formed on the back side of the recording sheet in the following way. The recording sheet on which the toner image is fixed by the fixing roller pair 307 is inverted by a paper inverting unit 309, and is guided to a duplex unit 308, which re-feeds the recording sheet to the transport path. Note also that the paper transport belt 304 can be retracted from the imaging units 302C, 302M, and 302Y of colors C, M, and Y, by up-and-down movement of a belt retracting roller 305, so as not to contact the photoconductors therein. When a monochrome image is formed, therefore, the imaging units 302C, 302M, and 302Y are not driven. This can decrease wear of the photoconductors and the other elements in the imaging units 302C, 302M, and 302Y.

(2) Construction of the Image Processing Unit 205

Figure 3:
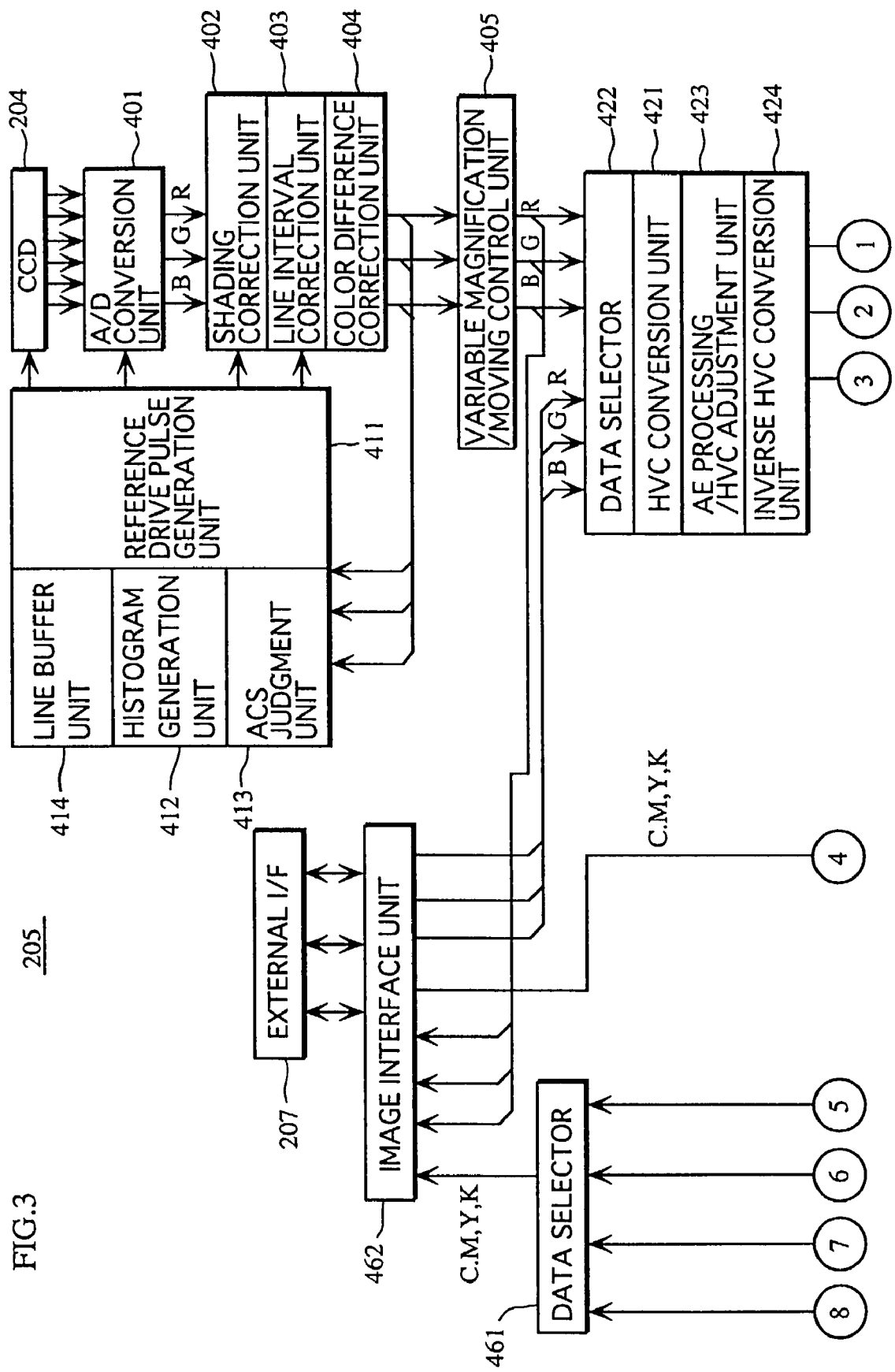
FIG. 3 is a functional block diagram showing the construction of an image processing unit 205.
Figure 4:
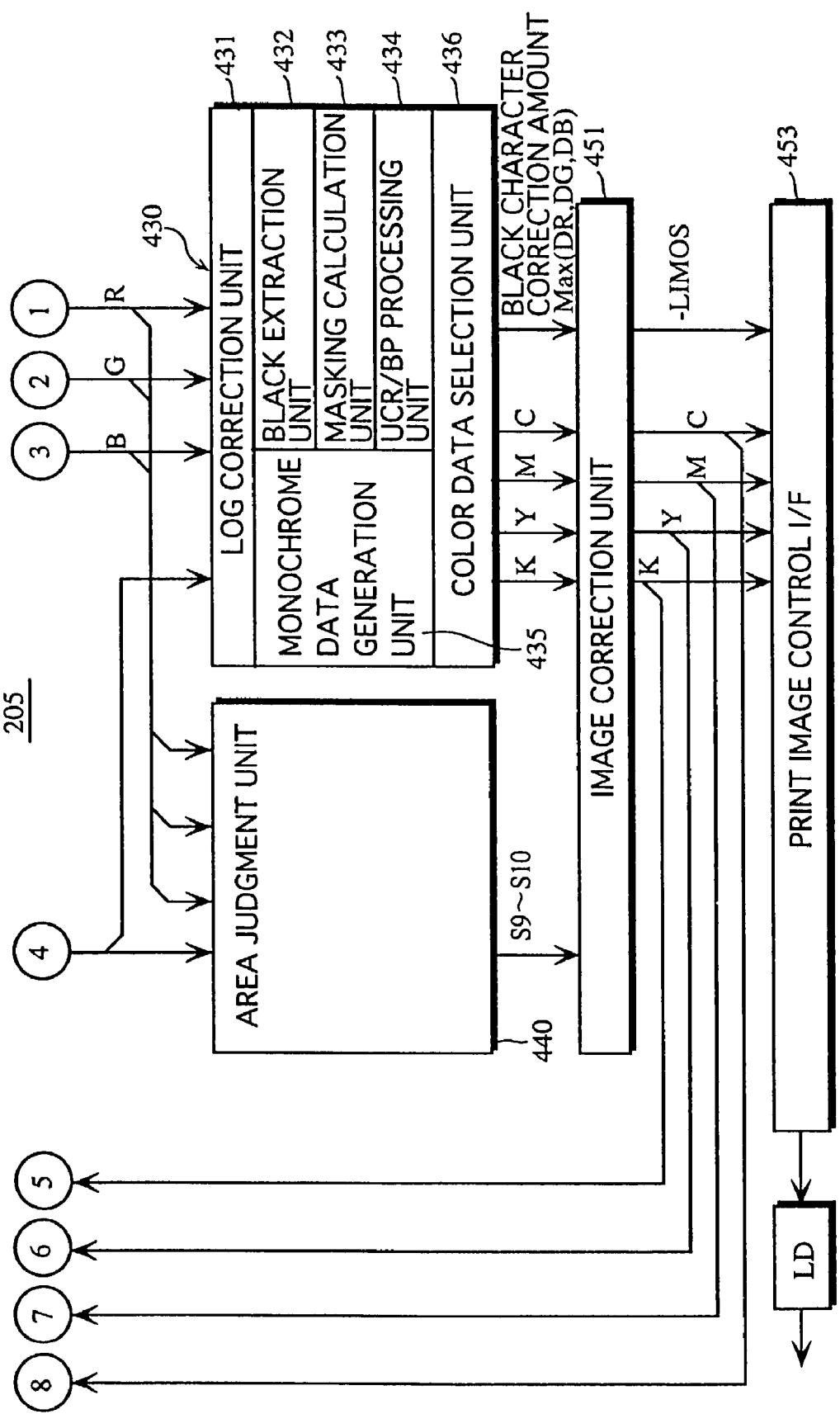
FIG. 4 is a functional block diagram showing the construction of the image processing unit 205.

The following describes the signal processing performed by the image processing unit 205 provided in the image reading unit 200. FIGS. 3 and 4 are functional block diagrams showing the construction of the image processing unit 205.

The CCD sensor 204 shown in FIG. 3 converts the document image into electric signals separated into respective colors of R, G, and B in accordance with the intensity of the light reflected from the surface of the document. The reading resolution of the CCD sensor 204 can be switched among 400 dpi, 600 dpi, 800 dpi, 1200 dpi, etc. An AD conversion unit 401 converts analogue signals outputted from the CCD sensor 204 into 8-bit digital data of 256 gradations for the R, G, and B information, based on a timing signal outputted from a reference drive pulse generation unit 411.

A shading correction unit 402 corrects the R, G, and B image data, to eliminate uneven light in the main scanning direction thereof. For the shading correction, data obtained by reading the shading correction plate 206 for each color is independently stored in an internal shading memory as reference data. To be more specific, the correction can be accomplished by converting reciprocally the reference data and multiplying the reciprocally converted data and the image data together when the document is scanned.

A line interval correction unit 403 aligns the reading position in the scanning direction of sensor chips of respective colors, R, G, and B, by delaying the image data of each color in line units using the internal field memory, in accordance with the scanning speed.

Due to the color difference phenomenon caused by an optical lens, the R, G, and B reading phase difference increases more as closer to the edge part of the document on the main scanning side. This may cause not only color aberration but also a misjudgment in an ACS judgment that is described later. In view of this, a color difference correction unit 404 corrects the R, G, and B phase difference based on chroma information.

A variable magnification/moving control unit 405 performs magnification/moving processing in the main scanning direction by using two magnification line memories for each of the R, G, and B image data and alternately inputting and outputting each one line while independently controlling the read/write timing. To be more specific, the variable magnification/moving control unit 405 accomplishes reduction by culling data when writing it to memory, and enlargement by diluting data when reading it from memory. In these controls, to prevent image loss and to decrease image coarseness, the variable magnification/moving control unit 405 performs an interpolation process on the data before writing it to memory for reduction and after reading it from memory for enlargement. These block control and scan control are combined not only for reduction and enlargement, but also for centering, image repeat, bound reduction, and the like.

A histogram generation unit 412 generates brightness data from the R, G, and B image data obtained by a preliminary scan, prior to operation-for copying the document. The histogram generation unit 412 then generates a histogram of the brightness data in memory. An automatic color selection (ACS) judgment unit 413 judges whether each dot is a color dot or not with reference to the chroma data. The ACS judgment unit 413 then generates, in memory, information showing the number of color dots in each 512*512 dot square mesh on a document. Based on the generated information, the ACS judgment unit 413 performs a copy background level automatic control (AE process) and a color or monochrome copy operation automatic color selection (ACS process).

A line buffer unit 414 has a memory that can store one line of the R, G, and B image data read by the image reading unit 200. The line buffer unit 414 monitors image data used for image analysis for automatic sensitivity correction of the CCD sensor 204 and automatic clamp correction of the AD conversion unit 401.

An HVC conversion unit 421 once converts the R, G, and B image data inputted via a data selector 422, into brightness (V data) and color difference signals (Cr and Cb data) via 3*3 matrix calculation.

Next, an AE processing unit 423 corrects the V data based on the above mentioned background level control value, and the Cr and Cb data in accordance with the chroma level and the hue level set on the control panel. Following this, an inverse HVC conversion unit 424 converts the V data and the Cr and Cb data back into the R, G, and B image data via 3*3 inverse matrix calculation.

In a color correction unit 430 shown in FIG. 4, a LOG correction unit 431 first converts the R, G, and B data into density data (DR, DG, and DB data), and then a black extraction unit 432 detects the smallest color level of the DR, DG, and DB data as document background components, and also detects the gradient level difference between the maximum color and minimum color of DR, DG, and DB as document chroma data.

A masking calculation unit 433 then performs a 3*6 nonlinear matrix calculation process on the DR, DG, and DB data, to convert the data into color data (C, M, Y, and K data) matching the color toner of the printer.

A UCR/BP processing unit 434 calculates the UCR/BP coefficients corresponding to the document chroma data for the document background components (Min(R,G,B)), and determines the UCR/BP amount by a multiple process. The UCR/BP processing unit 434 then subtracts an amount of under color removal (UCR) from the C, M, and Y data after the masking calculation, and calculates the C, M, and Y data and the K data (BP amount). Also, a monochrome data generation unit 435 generates the brightness component from the R, G, and B data and performs the LOG correction on the brightness component, to output the black data (DV data). Finally, a color data selection unit 436 selects the C, M, Y, and K data for a color copy image, and the DV data (C, M, and Y are white) for a monochrome copy image.

An area judgment unit 440 judges, based on the R, G, and B image data inputted via the data selector 422, whether each pixel included in the image data is in a halftone-dot area, whether each pixel is in an edge area of a character that is present on a halftone-dot area, and the like, and outputs area judgment signals S9 to S10 indicating a judgment result. The construction of the area judgment unit 440 is described in detail later.

An image correction unit 451 performs image correction processing such as smoothing on the C, M, Y, and K image data outputted from the color correction unit 430 as necessary, in accordance with an area judgment signal outputted from the area judgment unit 440. The image correction unit 451 then performs image correction processing on the C, M, Y, and K data in accordance with sharpness, color balance, and gamma level designated on the control panel. Then, the image correction unit 451 transmits the gradation reproduction attribute signals (-LIMOS) to a print image control interface 453. Also, the image correction unit 451 transmits the C, M, Y, and K data to an image interface unit 462 via a data selector 461 shown in FIG. 3.

The image interface unit 462 inputs and outputs image data, to and from an external device. The image interface unit 462 enables the R, G, and B data to be inputted and outputted at the same time and also, the C, M, Y, and K data to be inputted and outputted sequentially. The image interface unit 462 thereby enables the external device to utilize the scanner function and the printer function of the copying machine 1.

(3) Construction of the Area Judgment Unit 440

The following describes the schematic construction of the area judgment unit 440 relating to the present embodiment. The area judgment unit 440 judges whether a pixel whose area is to be judged (hereafter referred to as a "target pixel") is in a halftone-dot area, in an edge area of a character that is present on a halftone-dot area, and the like, based on the R, G, and B image data, and outputs area judgment signals S9 and S10 to the image correction unit 451. It should be noted that the present embodiment only describes a judgment as to whether a target pixel is in a halftone-dot area and a judgment as to whether a target pixel is in an edge area of a character that is present on a halftone-dot area. Other functions that are not related to the present invention (for example, functions that realize other judgments such as a judgment of a color area) are not described. The image correction unit 451 performs image correction processing such as smoothing and edge enhancement on the C, M, Y, and K data outputted from the color correction unit 430 as necessary, in accordance with the area judgment signals S9 and S10. Smoothing is one example of image correction processing suitable for pixels that are judged to be in a halftone-dot area, whereas edge enhancement is one example of image correction processing suitable for pixels that are judged to be in an edge area of a character that is present on a halftone-dot area. It should be noted that the area judgment signals S9 and S10 are hereafter respectively referred to as a halftone-dot judgment signal S9 and a character-on-halftone judgment signal S10.

Figure 5:
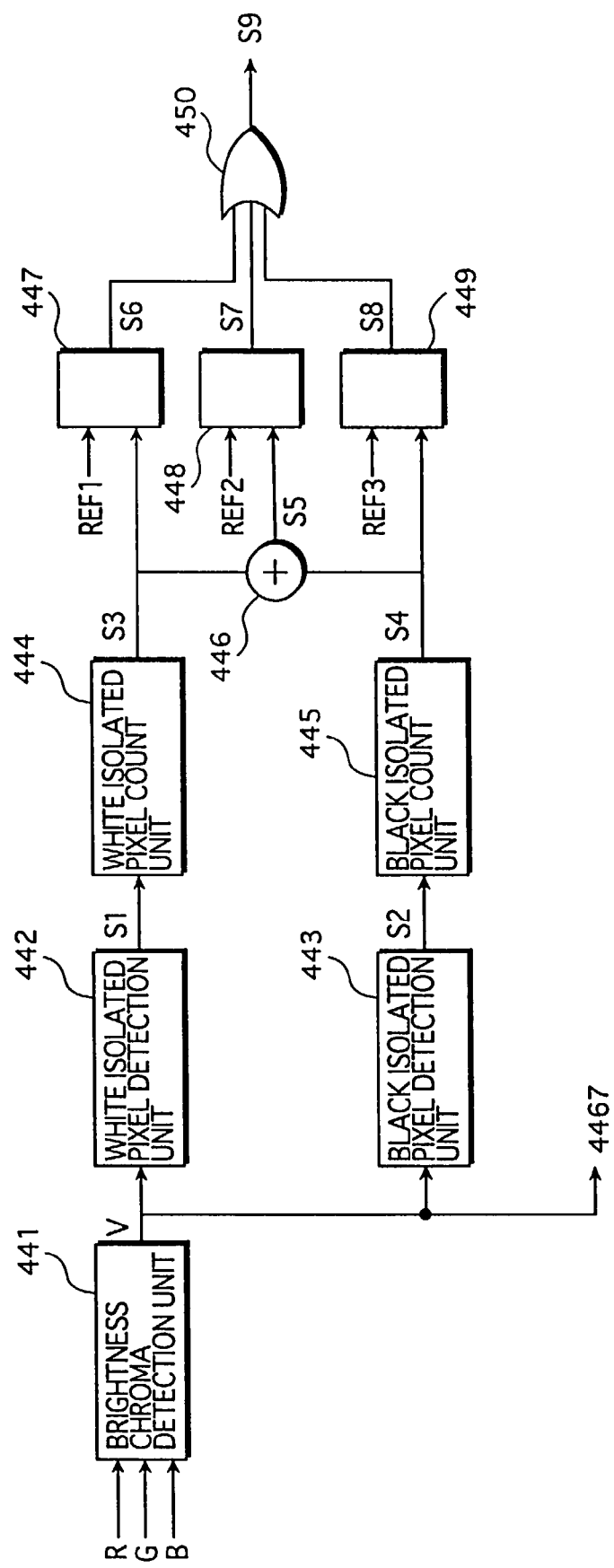
FIG. 5 shows the construction of an area judgment unit 440.

FIG. 5 schematically shows the construction of a component that realizes a judgment of a halftone-dot area in the area judgment unit 440 (hereafter referred to as a "halftone-dot judgment unit"). The halftone-dot judgment unit includes a brightness chroma detection unit 441, a white isolated pixel detection unit 442, a black isolated pixel detection unit 443, a white isolated pixel count unit 444, a black isolated pixel count unit 445, an addition unit 446, comparators 447 to 449, and an OR circuit 450. A halftone-dot judgment signal S9 is eventually outputted from the OR circuit 450. The following describes the operations of each unit included in the halftone-dot judgment unit in detail.

The brightness chroma detection unit 441 subjects the R, G, and B image data (reflected light data) to color space conversion, so as to generate chroma data and brightness data "V". It should be noted that chroma data is not described in detail in the present embodiment.

Figure 6:
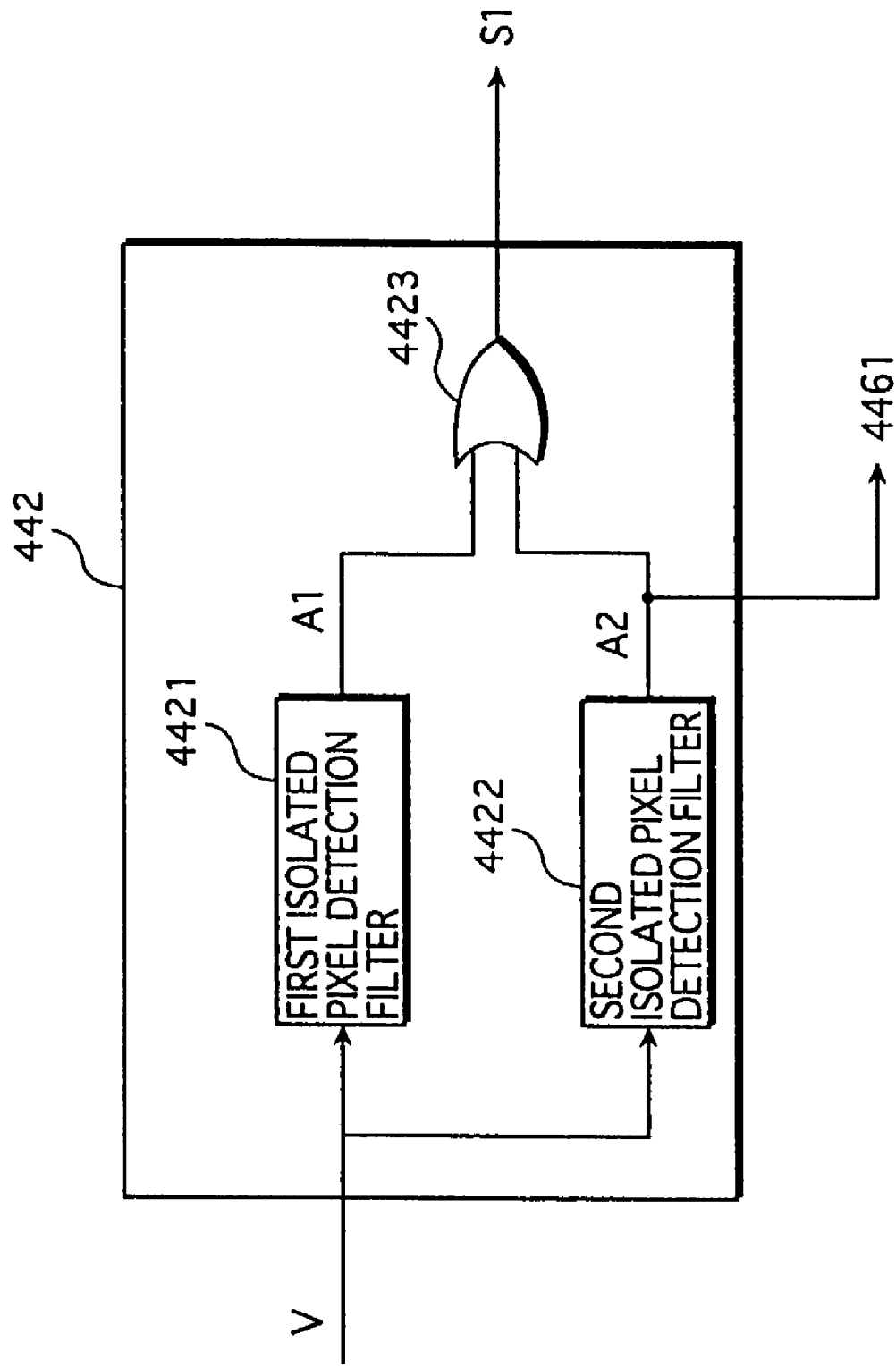
FIG. 6 shows the construction of a white isolated pixel detection unit 442.

The white isolated pixel detection unit 442 judges whether a target pixel is a white isolated pixel, by referring to comparison results of (a) brightness data of the target pixel and (b) brightness data of nearby pixels, using an isolated pixel detection filter with a predetermined size including the target pixel as the center. It should be noted that a plurality of isolated pixel detection filters with different sizes are used in the present embodiment. FIG. 6 shows the construction of the white isolated pixel detection unit 442 in detail.

As FIG. 6 shows, the white isolated pixel detection unit 442 includes a first isolated pixel detection filter 4421 and a second isolated pixel detection filter 4422. In the present embodiment, a filter with a size of 5*5 pixels shown in FIG. 7 is used in the first isolated pixel detection filter 4421, and a filter with a size of 7*7 pixels shown in FIG. 8 is used in the second isolated pixel detection filter 4422.

Here, the following describes in detail a specific example of the operation of the first isolated pixel detection filter 4421 when the isolated pixel detection filter with a size of 5*5 pixels shown in FIG. 7 is used. Here, a pixel "V33" in FIG. 7 is set as a target pixel, and a judgment is performed as to whether the target pixel "V33" is a white isolated pixel. The judgment is specifically performed using brightness data "L33" of the target pixel "V33", brightness data "L11" to "L15", and "L21" to "L25" etc., of nearby pixels "V11" to "V15" and "V21" to "V25" etc., based on whether one of the following conditions: inequality 1;inequality 2;and inequality 3, is satisfied or not.

Inequality 1

L33>MAX (L22, L23, L24, L34, L44, L43, L42, L32)

Inequality 2

L33>MAX (L11, L12, L13, L14, L15, L25, L35, L45, L55, L54, L53, L52, L51, L41, L31, L21)

Inequality 3

L33>MAX {(L11+L22)/2, (L13+L23)/2, (L15+L24)/2, (L55+L44)/2, (L53+L43)/2, (L51+L42)/2}

Note here that a "white isolated pixel" is a pixel with high brightness that stands isolated in a background of pixels with low brightness. To judge whether the target pixel is a black isolated pixel (a pixel with low brightness that stands isolated in a background of pixels with high brightness) in the black isolated pixel detection unit 443, the above inequalities 1, 2, and 3, in each of which a sign of inequality is inversed and MAX (maximum value) is replaced by MIN (minimum value) can be used. It should be noted here that one or more isolated pixels can construct one halftone-dot in a halftone-dot area.

The target pixel is judged to be an isolated pixel when at least one of the above inequalities 1, 2, and 3 is satisfied. By doing so, the first isolated pixel detection filter 4421 can deal with halftone-dot areas with various dot sizes, such as a halftone-dot area in which one halftone-dot consists of one pixel; a halftone-dot area in which one halftone-dot consists of four pixels (2*2 pixels); and a halftone-dot area in which one halftone-dot consists of nine pixels (3*3 pixels) or the like in case brightness of each pixel constituting one halftone-dot is not uniform.

The following describes the second isolated pixel detection filter 4422. In the present embodiment, as one example of a filter that differs in size from a filter used in the first isolated pixel detection filter 4421, an isolated pixel detection filter with a size of 7*7 pixels shown in FIG. 8 is used. In the second isolated pixel detection filter 4422, a pixel "V44" in FIG. 8 is set as a target pixel, and a judgment is performed as to whether the target pixel "V44" is a white isolated pixel. The judgment is specifically performed using brightness data "L44" of the target pixel "V44", brightness data "L11" to "L17", and "L21" to "L27" etc., of nearby pixels "V11" to "V17" and "V21" to "V27" etc., based on whether one of the following conditions: inequality 4;and inequality 5, is satisfied or not.

Inequality 4

L44>MAX (L11, L12, L13, L14, L15, L16, L17, L27, L37, L47, L57, L67, L77, L76, L75, L74, L73, L72, L71, L61, L51, L41, L31, L21)

Inequality 5

L44>MAX {(L11+L22)/2, (L12+L13+L23)/3, (L14+L24)/2, (L15+L16+L26)/3, (L26+L17)/2, (L36+L37+L27)/3, (L46+L47)/2, (L56+L57+L67)/3, (L66+L67)/2, (L65+L75+L76)/3, (L64+L74)/2, (L63+L72+L73)/3, (L62+L71)/2, (L51+L52+L61)/3, (L41+L42)/2, (L21+L31+L32)/3}

For the black isolated pixel detection unit 443 to judge whether the target pixel is a black isolated pixel, the above inequalities 4 and 5, in each of which a sign of inequality is inversed and MAX (maximum value) is replaced by MIN (minimum value) can be used.

The target pixel is judged to be an isolated pixel when one of the above inequalities 4 and 5 is satisfied. By doing so, the second isolated pixel detection filter 4422 can deal with a halftone-dot area in which a halftone-dot is larger than that in a halftone-dot dealt with by the first isolated pixel detection filter 4421 (a halftone-dot area with lower-resolution or higher-density).

In the white isolated pixel detection unit 442, an output signal A1 of the first isolated pixel detection filter 4421 and an output signal A2 of the second isolated pixel detection filter 4422 are inputted into the OR circuit 4423, from which a signal S1 is eventually outputted. In this way, a white isolated pixel signal S1 being set at "high", indicating that the target pixel is a white isolated pixel, is outputted when either of the first isolated pixel detection filter 4421 and the second isolated pixel detection filter 4422 judges that the target pixel is a white isolated pixel. As FIG. 9 shows, the black isolated pixel detection unit 443 has the same construction as the white isolated pixel detection unit 442. Accordingly, when either of a third isolated pixel detection filter 4431 (same as the first isolated pixel detection filter 4421) and a fourth isolated pixel detection filter4432 (same as the second isolated pixel detection filter 4422) in the black isolated pixel detection unit 443 judges that the target pixel is a black isolated pixel, the black isolated pixel signal S2 being set at "high" is outputted.

The following describes the white isolated pixel count unit 444 and the black isolated pixel count unit 445. The white isolated pixel count unit 444 and the black isolated pixel count unit 445 have the same construction. The white isolated pixel count unit 444 (or the black isolated pixel count unit 445) counts the number of pixels judged to be white isolated pixels (or black isolated pixels) in a predetermined area for example consisting of 9 (vertical)*45 (horizontal) pixels, by referring to a white isolated pixel signal S1 (or a black isolated pixel signal S2). Then, the white isolated pixel count unit 444 (or the black isolated pixel count unit 445) outputs a white isolated pixel count signal S3 (or a black isolated pixel count signal S4) that indicates a count result.

The output white isolated pixel count signal S3 is inputted into the addition unit 446 and the comparator 447. The comparator 447 compares the count result with a predetermined threshold REF1, and outputs a signal S6 being set at "high", indicating that the target pixel is in a halftone-dot area, when the count number of white isolated pixels is above the threshold REF1.

On the other hand, the black isolated pixel count signal S4 outputted from the black isolated pixel count unit 445 is inputted into the addition unit 446 and the comparator 449. The comparator 449 compares the count result with a predetermined threshold REF3, and outputs a signal S8 being set at "high", indicating that the target pixel is in a halftone-dot area, when the count number of black isolated pixels is above the threshold REF3.

The addition unit 446 adds the count number of white isolated pixels and the count number of black isolated pixels together, and outputs a signal S5. The signal S5 is inputted into the comparator 448, and is compared with a predetermined threshold REF2.

Such processing for adding the count number of white isolated pixels and the count number of black isolated pixels together, and comparing the resulting value with a predetermined threshold is not described in detail here because it is well known and disclosed in detail, for example, in the Japanese published unexamined application H11-266360. However, this addition processing can also improve detection accuracy of a halftone-dot area that is with neither extremely low-resolution (or high-density) nor extremely high-resolution (or low-density), that is, a halftone-dot area with an intermediate dot area rate. The comparator 448 compares the value resulting from adding the number of white isolated pixels and the number of black isolated pixels, with the threshold REF2, and outputs a signal S7 being set at "high" when the resulting value is above the threshold REF2. The OR circuit 450 takes a logical OR of the signals S6 to S8, and eventually outputs a halftone-dot judgment signal S9. The halftone-dot judgment signal S9 being "high" indicates that the target pixel is in a halftone-dot area.

The following describes the construction of a component that realizes a judgment of an edge area of a character that is present on a halftone-dot area, in the area judgment unit 443 (hereafter referred to as a "character-on-halftone area judgment unit"). FIG. 10 shows the construction of the character-on-halftone area judgment unit.

As the figure shows, the character-on-halftone area judgment unit includes a third isolated pixel count unit 4461, a fourth isolated pixel count unit 4462, a comparator 4463, a comparator 4464, an OR circuit 4465, a selector 4466, an inner edge detection unit 4467, an inner edge count unit 4468, a comparator 4469, and an AND circuit 4470.

The third isolated pixel count unit 4461 receives an output signal A2 of the second isolated pixel detection filter 4422, counts the number of isolated pixels in a predetermined area, for example, consisting of 9*45 pixels, and outputs a signal A5 indicating the count number of isolated pixels. The fourth isolated pixel count unit 4462 has the same construction as the third isolated pixel count unit 4461, and receives an output signal A4 of the fourth isolated pixel detection filter 4432, and outputs a signal A6 indicating the count number of isolated pixels.

The signal A5 is inputted into the comparator 4463 and compared with a threshold REF11, and the signal A6 is inputted into the comparator 4464 and compared with a threshold REF12. Note that the threshold REF11 and the threshold REF12 may be set at the same value. The comparators 4463 and 4464 respectively output signals A7 and A8 being set at "high", when the count numbers of isolated pixels are respectively above the thresholds REF11 and REF12. The signals A7 and A8 being "high" indicates either that a size of a halftone-dot that constitutes a halftone-dot area is relatively large (a halftone-dot area with high-density), or that an interval between adjacent dots therein is large (a halftone-dot area with low-resolution) The signals A7 and A8 are inputted into the OR circuit 4465. The OR circuit 4465 outputs a signal A9 being set at "high" when one of the signals A7 and A8 is "high"

The output of the OR circuit 4465 is inputted into the selector 4466 as a selection signal. This results in the threshold for the number of inner edge pixels being switched between the thresholds REF13 and REF14. To be more specific, the inner edge detection unit 4467 judges whether the target pixel is an inner edge pixel, based on input brightness data "V". Here, this judgment is performed by comparing an edge amount detected by a linear differential filter or a quadratic differential filter, with a predetermined threshold. The inner edge count unit 4468 counts the number of pixels judged to be inner edge pixels in a predetermined area. The comparator 4469 compares the count result (the number of inner edge pixels) with the threshold REF13 or with the threshold REF14.

The comparator 4469 outputs the signal A13 being set at "high", when the count number of inner edge pixels is above the threshold REF13 or the threshold REF14. The signal A13 being "high" indicates that the target pixel is judged to be in an edge area of a character. The signal A13 is inputted into the AND circuit 4470 together with the halftone-dot judgment signal S9, and the character-on-halftone judgment signal S10 is eventually outputted.

Figure 1:
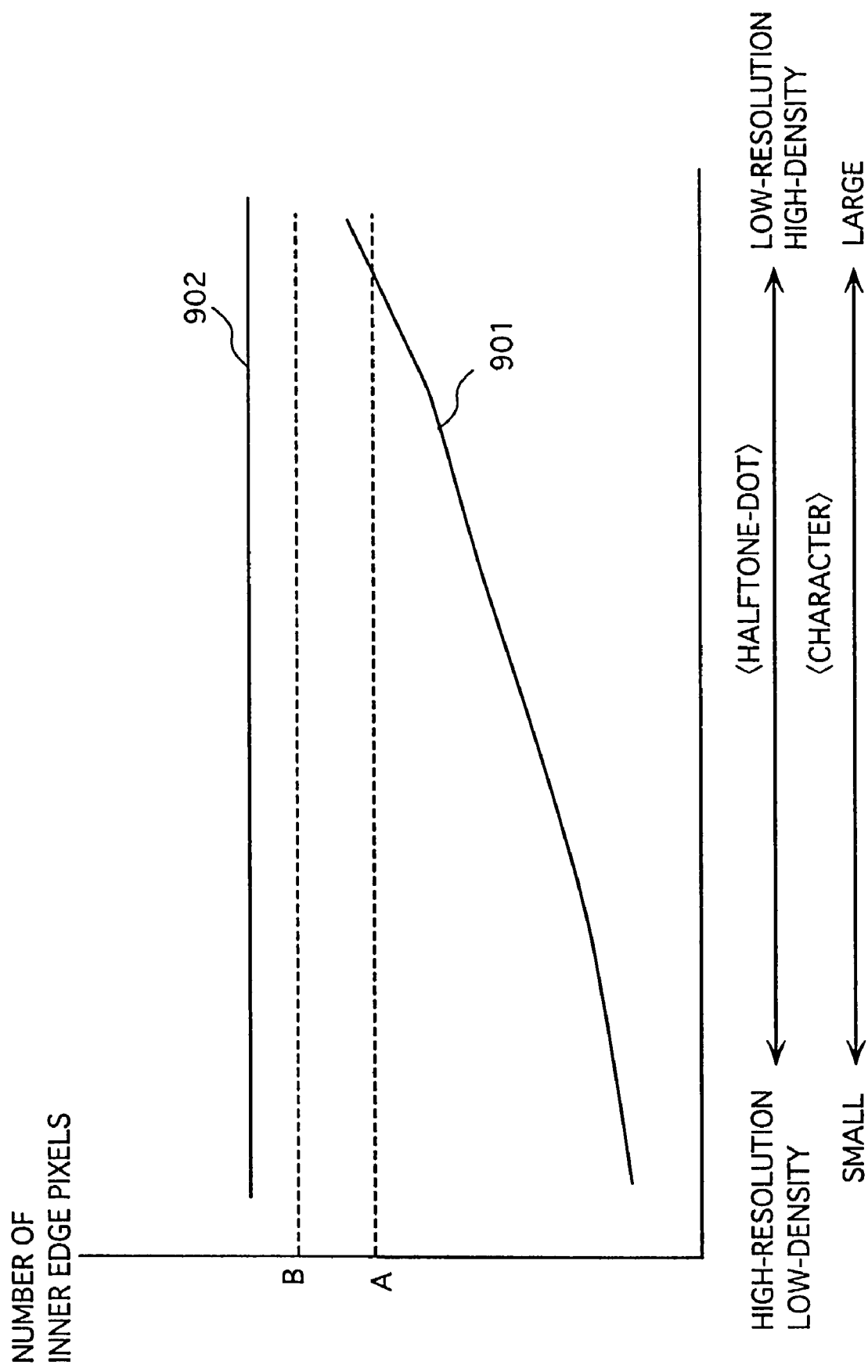
FIG. 1 is a drawing for explaining a case where a judgment of a halftone-dot area cannot be performed correctly in a conventional image processing apparatus.

As for specific values for the thresholds REF13 and REF14, it is needless to say that various conditions should be taken into consideration to determine appropriate values. Here, the values are assumed to satisfy the inequality "REF13 <REF14". FIG. 11 is a drawing for explaining the switch between the thresholds. In the figure, the vertical and horizontal axes indicate the same as in FIG. 1. The switch is performed between the threshold REF13(numeral 503 in the figure) and the threshold REF14(numeral 504 in the figure)

The threshold REF13 is used when a relatively small number of inner edge pixels are present in a predetermined area in the case of a halftone-dot area and accordingly misjudgment is considered less likely to occur even with a lowered threshold. In such a case, the threshold is set low, so as to prevent pixels in a character image from being misjudged to be pixels in a halftone-dot area.

The halftone-dot judgment signal S9 and the character-on-halftone judgment signal S10 are inputted into the image correction unit 451, where specifically, smoothing is performed when the target pixel is judged to be in a halftone-dot area (when only the signal S9 is "high") and edge enhancement is performed when the target pixel is judged to be in an edge area of a character that is present on a halftone-dot area (when both the signal S9 and the signal 10 are "high"). The contents of smoothing and edge enhancement are not described here as they are well known. (Modifications)

Although the present invention has been described based on the above embodiment, it should not be limited to these specific examples described above in detail. For example, the following modifications are possible.

(1) The above embodiment describes the case where the number of isolated pixels detected by the isolated pixel detection filter is counted by the isolated pixel count unit, and the threshold is switched based on the count number of isolated pixels. This means that the threshold is switched based on a characteristic of a halftone-dot area (a size of a halftone-dot that constitutes a halftone-dot area, etc.). However, the threshold can be switched based on only resolution of a halftone-dot area or only density of a halftone-dot area. It should be noted that, in a strict sense, judging only resolution of a halftone-dot area or only density of a halftone-dot area may not be possible with the method that uses an isolated pixel detection filter employed in the above embodiment, although a size of a halftone-dot may relate to resolution or density of a halftone-dot area. However, resolution or density can be judged with other methods, or can be judged based on a setting inputted manually via a control panel and the like.

(2) Although the above embodiment describes the case where the threshold is switched based on the number of isolated pixels detected by using an isolated pixel detection filter with a size of 7*7 pixels, it should be clear that the present invention is not limited to the method described in the above embodiment. A size of the isolated pixel detection filter may be changed, or a plurality of isolated pixel detection filters with different sizes may be used and a logical OR may be taken. As one specific example, an isolated pixel detection filter with a size of 9*9 pixels may be used in addition to the above filter with a size of 7*7 pixels. Also, the switch between the thresholds REF13 and REF14 may be performed based on rising edge or falling edge of an output signal A9 of the OR circuit 4465.

(3) Although the above embodiment describes the case where the inequalities 1 to 5 are used to detect an isolated pixel, these inequalities may be changed suitably.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus, comprising:
    a character-on-halftone area judgment unit for judging whether a target pixel is in an edge area of a character that is present on a halftone-dot area, using a parameter;
    a halftone-dot characteristic judgment unit for judging a characteristic of a halftone-dot area, when the target pixel is in the halftone-dot area; and
    a selector for switching between a plurality of parameters to be used by the character-on-halftone area judgment unit, based on a judgment result of the halftone-dot characteristic judgment unit.

2. The image processing apparatus of claim 1,
    wherein the character-on-halftone area judgment unit includes:
    an edge detection unit for detecting an edge pixel, the edge pixel being a pixel in an edge area;
    an edge pixel counter for counting a number of edge pixels detected in a predetermined area by the edge detection unit; and
    a comparator for comparing the number of edge pixels counted by the edge pixel counter with a threshold.

3. The image processing apparatus of claim 2,
    wherein the selector switches between a plurality of thresholds that are the plurality of parameters.

4. The image processing apparatus of claim 1,
    wherein the halftone-dot characteristic judgment unit judges a size of a dot that constitutes the halftone-dot area, and
    the selector switches between the plurality of parameters, based on the size of the dot.

5. The image processing apparatus of claim 1,
    wherein the halftone-dot characteristic judgment unit includes:
    an isolated pixel judgment unit for judging that the target pixel is an isolated pixel, when a relationship between (a) brightness of the target pixel and (b) brightness of a plurality of pixels at predetermined positions with respect to the target pixel satisfies a predetermined condition; and
    an isolated pixel counter for counting a number of isolated pixels in a predetermined area, and
    the halftone-dot characteristic judgment unit judges the characteristic of the halftone-dot area, based on the number of isolated pixels counted by the isolated pixel counter.

6. The image processing apparatus of claim 5,
    wherein the isolated pixel judgment unit includes a filter used for judging that the target pixel is an isolated pixel, when the target pixel is included in a dot whose size is substantially within a predetermined range and that constitutes the halftone-dot area.

7. The image processing apparatus of claim 5, further comprising:
    a second isolated pixel counter for counting a number of isolated pixels in a predetermined area; and
    a halftone-dot area judgment unit for judging whether the target pixel is in a halftone-dot area, by comparing the number of isolated pixels counted by the second isolated pixel counter with a threshold.

8. The image processing apparatus of claim 1,
    wherein the halftone-dot characteristic judgment unit judges resolution of the halftone-dot area, and
    the selector switches between the plurality of parameters, based on the resolution of the halftone-dot area.

9. The image processing apparatus of claim 1,
    wherein the halftone-dot characteristic judgment unit judges density of the halftone-dot area, and
    the selector switches between the plurality of parameters, based on the density of the halftone-dot area.

10. The image processing apparatus of claim 1, further comprising
    an image correction unit for correcting image data, in accordance with a judgment result of the character-on-halftone area judgment unit.

11. An image forming apparatus, comprising:
    a character-on-halftone area judgment unit for judging whether a target pixel is in an edge area of a character that is present on a halftone-dot area, using a parameter;
    a halftone-dot characteristic judgment unit for judging a characteristic of a halftone-dot area, when the target pixel is in the halftone-dot area; and
    a selector for switching between a plurality of parameters to be used by the character-on-halftone area judgment unit, based on a judgment result of the halftone-dot characteristic judgment unit;
    an image correction unit for correcting image data, in accordance with a judgment result of the character-on-halftone area judgment unit; and
    an image forming unit for forming an image, based on the image data corrected by the image correction unit.

12. An image forming method, comprising:
    a halftone-dot characteristic judgment step of judging a characteristic of a halftone-dot area, when a target pixel is in the halftone-dot area;
    a parameter determination step of determining, based on a judgment result in the halftone-dot characteristic judgment step, a parameter to be used for judging whether the target pixel is in an edge area of a character that is present on the halftone-dot area; and
    a character-on-halftone area judgment step of judging whether the target pixel is in an edge area of a character that is present on the halftone-dot area, using the parameter determined in the parameter determination step.

13. The image processing method of claim 12,
    wherein the halftone-dot characteristic judgment step includes:
    an isolated pixel extraction substep of extracting, using a filter, an isolated pixel to be used for judging the characteristic of the halftone-dot area;
    an isolated pixel count substep of counting a number of isolated pixels in a predetermined area; and
    a halftone-dot characteristic judgment substep of judging the characteristic of the halftone-dot area, based on the number of isolated pixels counted in the isolated pixel count substep.

* * * * *